United States Patent [19]

Orain

[11] Patent Number: 4,592,735
[45] Date of Patent: Jun. 3, 1986

[54] ARRANGEMENT OF TWO ELEMENTS WHICH UNDERGO ALTERNATING RELATIVE MOTION AND ITS APPLICATION OF SLIDABLE HOMOKINETIC JOINTS

[75] Inventor: Michel A. Orain, Conflans Sainte Honorine, France

[73] Assignee: Glaenzer Spicer, Poissy, France

[21] Appl. No.: 664,073

[22] Filed: Oct. 23, 1984

[30] Foreign Application Priority Data

Nov. 4, 1983 [FR] France .................. 83 17576

[51] Int. Cl.⁴ ................ F16D 3/06; F16D 3/20
[52] U.S. Cl. ...................... 464/111; 464/167; 464/905; 384/44
[58] Field of Search ............ 308/6 R, 2 R; 464/111, 464/120, 122, 162, 167, 905

[56] References Cited

U.S. PATENT DOCUMENTS 2,400,374 5/1946 Selnes .

FOREIGN PATENT DOCUMENTS

| 2604995 | 8/1977 | Fed. Rep. of Germany . |
| 2176361 | 10/1973 | France . |
| 2476251 | 8/1981 | France . |
| 2525306 | 10/1983 | France . |
| 891118 | 3/1962 | United Kingdom . |
| 2099551 | 12/1982 | United Kingdom . |

Primary Examiner—Stuart S. Levy
Assistant Examiner—Daniel P. Stodola
Attorney, Agent, or Firm—Wenderoth, Lind & Ponack

[57] ABSTRACT

A row arrangement of needles (17) maintained in a plate (18) is interposed between a raceway (13) and a slide or bush (14) which itself cooperates with a trunnion (11). The needles have a diameter which progressively increases from the center of the row to the end needles so as to achieve a self-centering of the plate.

8 Claims, 2 Drawing Figures

ARRANGEMENT OF TWO ELEMENTS WHICH UNDERGO ALTERNATING RELATIVE MOTION AND ITS APPLICATION OF SLIDABLE HOMOKINETIC JOINTS

The present invention relates to arrangements of the type in which two elements between which are disposed rolling members maintained in position by a cage, undergo an alternating relative motion. The rolling members may be needles and, in this case, the assembly consisting of the needles and their cage is designated by the term "needle plate". Such needle plates advantageously eliminate friction and wear and can operate without clearance. They are practically essential when large loads are to be transmitted to parts undergoing a rapid continuous alternating motion, as is the case in sliding tripod joints operating at an angle.

In such arrangements, when the alternating motions have a variable amplitude, there is a problem of the centering of the ring arrangement of needles which, in theory, moves to an extent equal to one half of the relative displacement of the two elements. This problem results from the fact that, in operation, the ring arrangement of needles which are maintained in contact with one another by their cage, becomes offcentre or offset progressively in one direction or the other until a limit of travel determined by a mechanical abutment is reached. At this moment, there is an impact and a sliding under load which are of course harmful and the opposite of what is desired.

An arrangement is also known from the patent FR-2 176 361 in which the bearing function between the two elements which may be displaced with respect to each other, performed by the rolling members maintained by a cage, and the cage returning function are ensured by different means. The return of the cage is achieved by rollers of a diameter which is substantially larger than that of the rolling members each of which cooperates with two inclined walls provided on the two confronting elements.

This arrangement has serious drawbacks. If the angle of inclination of the walls is small (1° or 2°), one of the rollers may be retained by a wedging between the walls and may carry alone the whole of the load with for consequence a deterioration of the rolling surfaces.

On the other hand, if the inclination of the inclined planes is increased to 15°, the possible travel of the device is considerably reduced unless return rollers of very large diameter are used. Further, this prior device is of large size, has a low performance and is complicated to construct. Therefore, it can in no way be used in an industrial application such as that contemplated in the present application.

An object of the invention is therefore to provide a return device which is small, easy to mount and which has a very small overall size and is cheap. Furthermore, in the application to a slidable homokinetic joint, this return device must not compromise the very free sliding and the neutrality of the joint.

The invention therefore provides an arrangement of two elements which undergo with respect to each other alternating sliding motion, between which are interposed rolling members maintained in position by a cage, means being provided for returning the cage to a given position relative to one of said elements, wherein said rolling members have respective diameters which progressively increase from at least one median member in the direction of end members and thus constitute said return means.

According to a preferred embodiment, the rolling members are needles.

According to other features:

the ratio between the diameters of the rolling members varies between 1 and 1.01, and preferably between 1 and 1.005;

the law of variation of the diameters is such that the envelope of the rolling members has a roughly parabolic shape.

The invention will be described in more detail hereinafter with reference to the accompanying drawing which is given solely by way of example and in which.

In the chosen embodiment, it will be assumed that the invention is applied to a slidable homokinetic joint of the tripod type.

Figure 1:
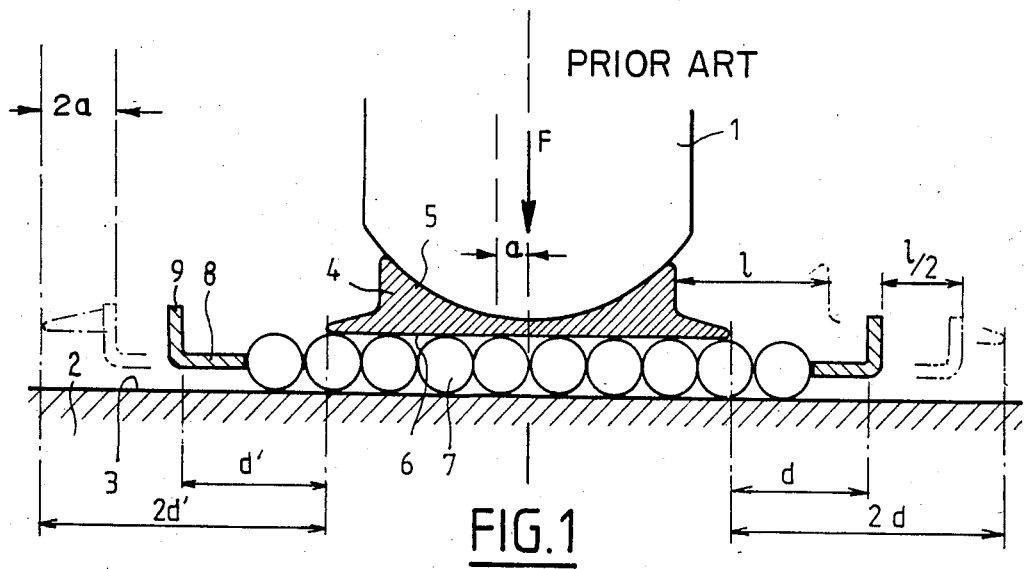
FIG. 1 is a view of a known arrangement of two elements which may undergo with respect to each other a sliding motion.

In FIG. 1, the reference 1 designates a tripod trunnion of this joint and the reference 2 designates a barrel of the joint in which are defined the planar raceways, such as 3. Between the trunnion and the raceway, there is interposed, on one hand, a slide or bush 4 having on one side a concave bearing surface adapted to cooperate with the convex spherical bearing surface of the trunnion and, on the other side, a planar surface which is in confronting relation to the raceway 3. Interposed between this planar surface and the raceway are rolling members 7, here in the form of needles maintained in position by a cage or plate 8 defining stops 9 at its ends.

A load F exerted by the trunnion is transmitted through the bush 4 and the needles 7 to the raceway 3. When an alternating motion of amplitude 1 of the bush occurs, the plate or cage 8 undergoes an alternating motion of amplitude 1/2. When the bush is centered relative to the ring arrangement of needles, the distances d and d' between the ends of the slide and the stops 9 are equal and the freedom of displacement by rolling is equal to 2d toward the right and 2d'=2d toward the left. On the other hand, if the needle plate is offcentered or offset by a distance a, the freedom of displacement by rolling is obviously reduced by a distance 2a. If the offcentering reaches 2d, the freedom of displacement by rolling becomes zero, the edge of the slide being constantly in abutting relation against one of the stop surfaces of the plate.

Figure 2:
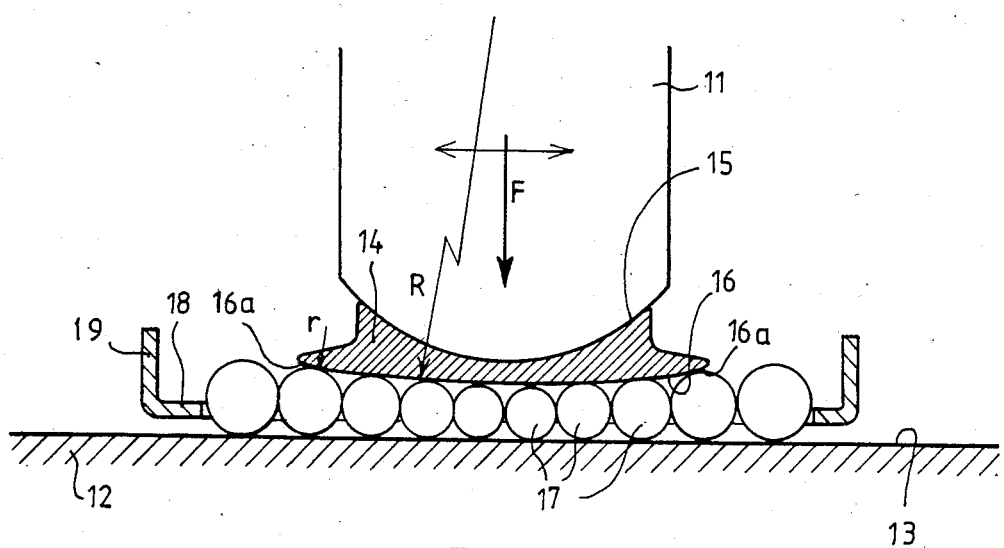
FIG. 2 is a view of a similar arrangement improved in accordance with the invention, the dimensions being considerably exaggerated for reasons of clarity.

According to the invention and as shown in FIG. 2, the needles 17 interposed between the confronting surfaces 16, 13 of the slide 4 and of the raceway 12 do not all have the same diameter, this diameter increasing from the median member or members in the direction of the end members. Preferably, the law of variation of this diameter is roughly parabolic so as to ensure, under a nominal force F, a load per needle which is roughly equal for all the needles, bearing in mind the deformation of the slide. The latter is constructed in such way that it can be assumed, as a first approximation, that its planar surface 16 is deformed under load according to a cylindrical surface of large radius R and that the needles remain, under load, tangent to this surface.

By way of example, in respect of needles having a nominal diameter equal to 3.5 mm, the needles of rank 1, 2, 3, 4 and 5 will have respectively for diameter, in starting at the central needles: 3.500–3.502–3.505–3.5-10–3.516 mm. More generally, it can be assumed that the ratio of the diameters, at least in this type of application, will be between 1 and 1.01 and preferably between 1 and 1.005.

In this way, if the slide is eccentric, it receives a small continuous force tending to reduce its eccentricity and which is in practice sufficient to ensure the practically immediate re-centering of the ring arrangement of needles relative to the slide. For example, if F=3,000N, this re-centering stress may be between 4 and 10N. It is therefore rather small, so that it has no undesirable effect on the axial freedom of sliding of the joint, but it is nonetheless greater than the secondary stresses which would be liable to produce a travel rendering the slide eccentric in the continuous alternating motion of the joint operating at an angle.

In order to encourage the engagement of the needles under the slide, the bearing surface 16 of the slide, which is planar in the free state, has at its end 16a a beginning of a radius r of large curvature obtained by abrasion in a barrel or by any other known method.

The advantages of the device just described are the following:

this device is effective for achieving the self-centering of the ring arrangement of rolling members without producing a disturbance in the free sliding motion of the homokinetic joint or other device to which the invention is applied;

it is sturdy, very simple and reliable;

its cost is practically nil, since the differential diameters of the needles are obtained by an automatic sampling by means of installations which exist already;

this device results in no additional overall size;

the distribution of the pressure is roughly even throughout the needles; consequently, there is a maximum capacity of transfer of the load through the ring arrangement of needles and a capacity which is also maximum for the joint equipped in this way.

What is claimed is:

1. An assembly comprising two elements which undergo a motion with respect to each other, a row of aligned and adjacent rolling members interposed between and in rolling engagement with said elements, a cage maintaining the rolling members in position, and means for returning the cage to a given position relative to a first of said elements, said means comprising an arrangement in which said rolling members have respective diameters which progressively increase from rolling member to rolling member from a centre of said row of rolling members in a direction toward end rolling members of said row, said first element having a convex rolling surface which is such as to rollingly engage substantially all of said rolling members.

2. An assembly according to claim 1, wherein the rolling members are needles.

3. An assembly according to claim 1, wherein the ratio between the diameters of the rolling members varies between 1 and 1.01.

4. An assembly according to claim 1, wherein the ratio between the diameters of the rolling members varies between 1 and 1.005.

5. An assembly comprising two elements which undergo a motion with respect to each other, a row of aligned and adjacent rolling members interposed between and in rolling engagement with said elements, a cage maintaining the rolling members in position, and means for returning the cage to a given position relative to one of said elements, said means comprising an arrangement in which said rolling members have respective diameters which progressively increase from rolling member to rolling member from a centre of said row of rolling members in a direction toward end rolling members of said row, the law of variation of the diameters being such that the envelope of the rolling members has a generally parabolic shape.

6. An assembly comprising two elements which undergo a motion with respect to each other, a row of aligned and adjacent rolling members interposed between and in rolling engagement with said elements, a cage maintaining the rolling member in position, and means for returning the cage to a given position relative to one of said elements, said means comprising an arrangement in which said rolling members have respective diameters which progressively increase from rolling member to rolling member from a centre of said row of rolling members in a direction toward end rolling members of said row, said one of the two elements being resiliently deformable under load so as to remain in contact with the rolling members of different diameters.

7. An assembly according to claim 6, wherein said deformable element has, in the free state, a roughly planar surface which is in contact with the rolling members and includes two convex portions along opposed edges thereof.

8. The combination comprising a trunnion of a tripod element of a homokinetic joint and a barrel of said joint defining a raceway for the trunnion, and an assembly for the trunnion, said assembly comprising two elements which undergo a motion with respect to each other, a row of aligned and adjacent rolling members interposed between and in rolling engagement with said elements, a cage maintaining the rolling members in position, and means for returning the cage to a given position relative to a first of said elements, said means comprising an arrangement in which said rolling members have respective diameters which progressively increase from rolling member to rolling member from a centre of said row of rolling members in a direction toward end rolling members of said row, said first element having a convex rolling surface which is such as to rollingly engage substantially all of said rolling members, said first element of said two elements undergoing relative motion being a slide cooperable with the trunnion of said tripod element and the other of said elements undergoing said motion being said barrel with the raceway of which said rolling members are rollingly engaged.

* * * * *